Sept. 20, 1955 S. A. WILLS ET AL 2,718,064
SCREWTHREAD GAUGES
Filed Feb. 19, 1953 2 Sheets-Sheet 2
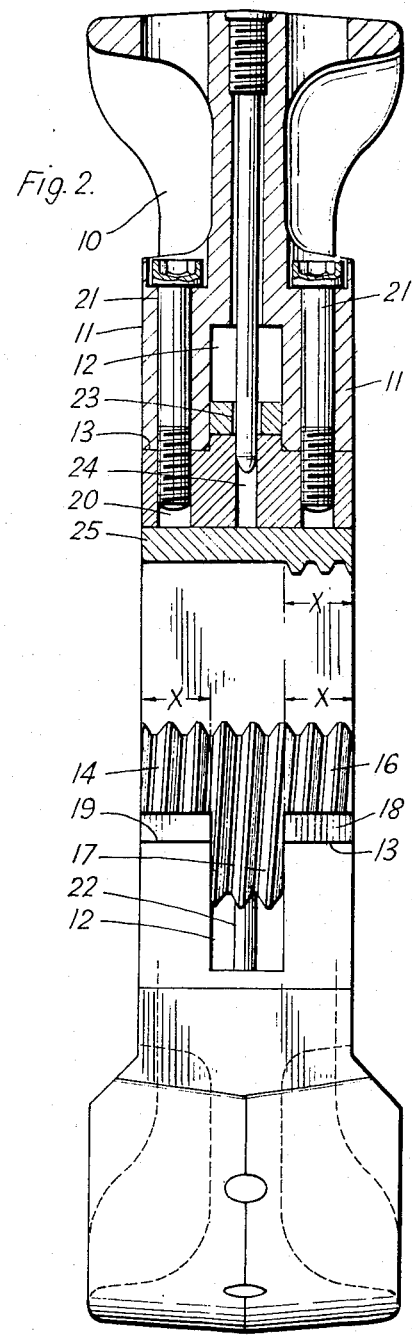
Inventors
Sydney A. Wills
Evan F. J. Gathercole
By Watson, Cole, Grindle
& Watson
Attorneys United States Patent Office 2,718,064
Patented Sept. 20, 1955

2,718,064

SCREWTHREAD GAUGES

Sydney Arthur Wills and Evan Frederick James Gathercole, London, England, assignors to Tolimit Gauges Limited, London, England, a British company Application February 19, 1953, Serial No. 337,813

1 Claim. (Cl. 33—199)

This invention relates to screwthread gauges, such as comparators or calliper gauges, in which the gauging is carried out between or over at least one pair of gauging members, depending on whether the gauge is for gauging an external or an internal screwthread. In a calliper gauge the gauging members are carried by a rigid body and are held in accurately spaced relationship, in which case a characteristic, or the combined effect of a number of characteristics, of the screwthread being gauged is indicated by the ability or otherwise of the screw to be passed between or over the gauging members. In a comparator the gauging members are mounted on relatively movable supports and means are provided for indicating the relative positions of the supports and hence a characteristic, or the combined effect of a number of characteristics, of the screwthread being gauged when the screw is passed between or over the gauging members.

In some cases a calliper gauge may be a composite one having two pairs of gauging members, one pair forming a "go" pair and the other pair forming a "not-go" pair. In such cases the gauge is so arranged that a screwthread to be gauged and whose characteristics lie within a permitted tolerance can be passed between or over the "go" pair of gauging members but cannot be passed between or over the "not-go" pair.

It is one object of the present invention to provide a screwthread gauge having an improved form of mounting for the gauging members.

In a screwthread gauge according to the present invention a gauging member, or a mounting member therefor, is formed with a flat surface and means is provided for securing the gauging member or the mounting member to a supporting structure with the said flat surface seating firmly upon a corresponding flat surface formed on the supporting structure in a plane approximately parallel to the direction in which the gauge is applied to the screwthread to be gauged.

By providing a flat seating surface, the gauging member or a mounting member therefor can be pulled down tightly against the supporting structure without risk of any appreciable distortion through high local stresses such as might occur in arrangements where the effective contact between the mounting member or gauging member and the supporting structure is confined to a small area. Again, if in a calliper gauge an attempt is made to force a screwthread between or over the gauging members, a considerable force will be applied to the body of the gauge through the gauging members, or the mounting members if provided, in a direction perpendicular to the said flat surface. This load will therefore be transmitted to the body over a comparatively large surface area, thus avoiding high local stresses.

Gauges embodying the invention are suitable for a variety of uses, but the invention is applicable more particularly to "go and not-go" calliper gauges for gauging external screw threads, and the invention will be described more particularly in relation to such gauges. Thus, in one form of the invention for gauging external screwthreads the body is in the form of a U and carries two pairs of gauging members the elements of which are arranged opposite to one another on the inner surfaces of the limbs of the U, the gauging members constituting "go" and "not-go" pairs.

In one form of the invention each gauging member is carried on a supporting member in the form of a pin having adjacent to each of its ends a flat parallel to its axis, the flats seating directly on corresponding flats formed on the supporting structure. In this form of the invention a part of the gauging member which engages the screwthread being gauged preferably lies diametrically opposite to a flat on the pin so that a force applied to this part of the gauging member during gauging is transmitted directly through the pin to the supporting structure without subjecting the pin to bending or shear.

The invention may be carried into practice in various ways but one particular embodiment, namely a "go and no-go" calliper gauge for external screw threads, will be described by way of example with reference to the accompanying drawings in which:

Figure 2 is an end view of the gauge, partly in section, taken along the line II—II of Figure 1.

Figure 1:
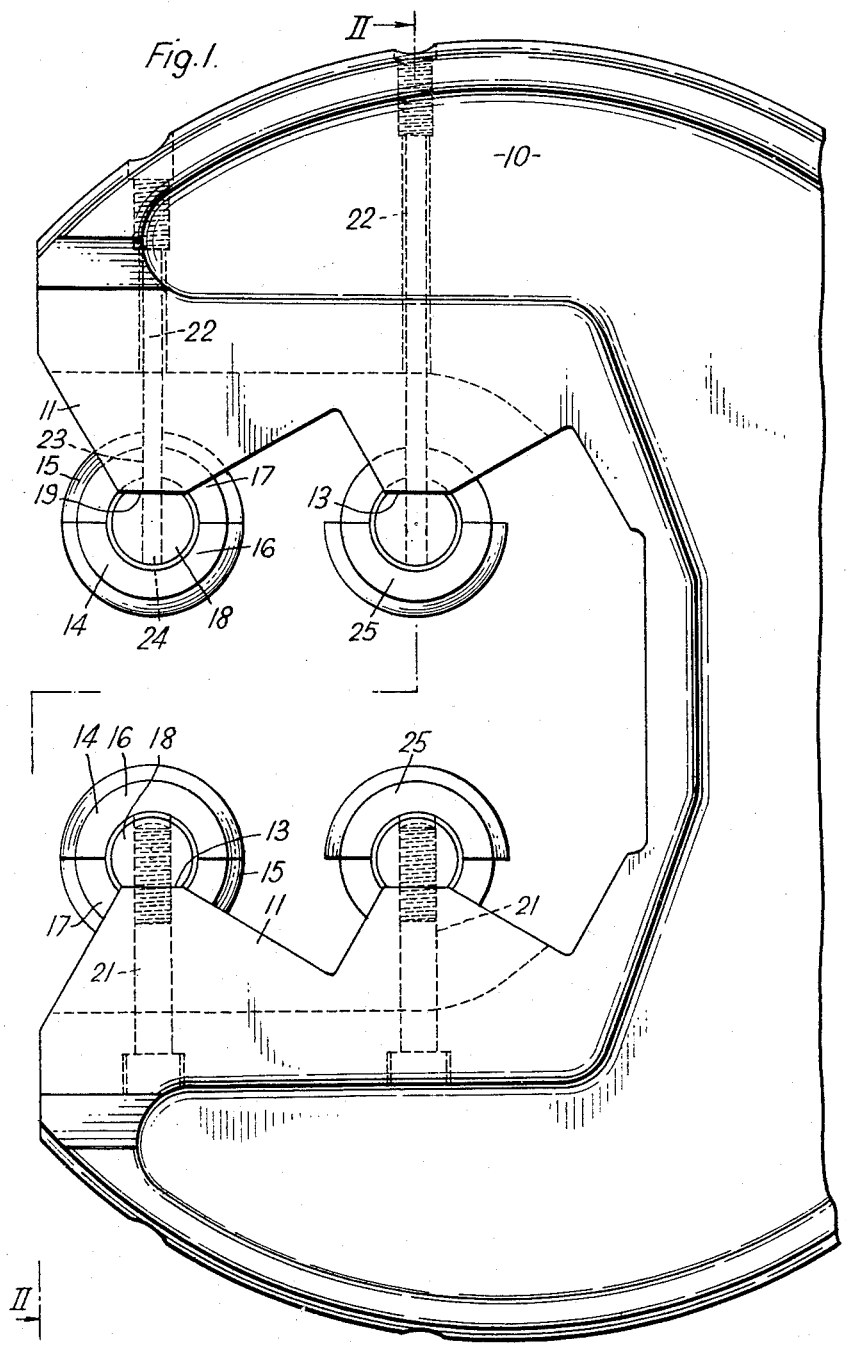
Figure 1 is a side elevation of the gauge.

As shown in the drawings the gauge comprises a strong and rigid body 10 of generally U-shaped form. Projecting inwardly from the limbs of the U are flanges 11 spaced apart by a gap 12. Formed on the inner ends of these flanges are parallel flat seatings 13.

Adjacent to the extremities of the limbs are the "go" gauging members 14. These are in the form of rolls provided around their periphery with full form screw threads 15. These screw threads extend for the full width of the rolls for only a portion of the circumference, as shown at 16, the remaining portion 17 being narrow enough to fit in the gap 12. Passing through hollow centres of the rolls are mounting members in the form of cylindrical pins 18 which are provided with flats 19. There are threaded holes 20 through these pins in the centres of the flats, into which are screwed securing bolts 21 for holding the pins 18 with their flats 19 abutting against the flats 13 of the body 10. The pins 18 are thus rigidly and firmly held in place with a large area of contact between them and the body. It is not necessary for the rolls to be a very close fit on the pins, since during gauging each roll will be urged into a position in which its bore makes close contact with that part of the surface of the pin which lies nearest to the screw being gauged. It is therefore not neecssary to employ extreme accuracy when machining the flats 13 of the body 10, since any small discrepancies in the distance between opposite flats can be compensated by selecting pins 18 of suitable diameter (within limits) or pins having the appropriate dimension between the flats 19 and the cylindrical surface on the opposite side of the pin. Also, alternative pairs of gauging members could be provided such that one pair can be substituted for another on the flats 13 of the body 10 without the necessity for high precision fitting.

For holding each roll against rotation a locating needle 22 is provided which passes through a transverse hole 23 midway along the roll and enters a bore 24 in the pin 18.

The "not-go" part of the gauge comprises two rolls 25 which are in general somewhat similar to the rolls 14, being mounted on identical pins 18 and having similar cut away parts. In this case, however, the thread form is different in that it is relieved so that it will make contact with the component to be gauged only in the region of the pitch line of the thread. Moreover, not more than three threads are provided in order that no account will be taken of errors in pitch, and these threads are arranged at one side of the roll as shown in Figure 2 so that the gauge can be applied right up to the head of a screw.

While the invention has been described particularly in relation to a "go and not-go" calliper gauge for external screw threads, it will be appreciated that it is readily adaptable to other kinds of screw thread gauges, such as calliper gauges for internal screw threads, and comparators for external and internal screw threads.

It will be observed from Figure 2 that if a load is applied to the rolls during gauging, anywhere in the zones marked X, this load will be transmitted directly through the pins 18 to the body 10 without subjecting the pin to bending or shear.

What we claim as our invention and desire to secure by Letters Patent is:

A gauge for gauging a screw threaded part comprising a body, and at least two rotary gauging members, the body having at least two surface seatings arranged approximately parallel to the direction in which the gauge is to be applied to the screw threaded part to be gauged, and parallel to the axis of the screw threaded part to be gauged, and including at least two supporting pins on which said rotatary gauging members are mounted, each of said pins being provided with a flat adjacent to each of its ends and in a plane parallel to its axis to cooperate with said flat surface seatings on said body, and means for securing said supporting pins to said body with the said flat surfaces in close cooperation, a part of each rotary gauging member which engages the screw thread to be gauged lying diametrically opposite to the flat on the respective supporting pin, so that a force applied to this part of the gauging member during gauging is transmitted directly through the pin to the flat surface seating on the body without subjecting the pin to bending or shear.

References Cited in the file of this patent

UNITED STATES PATENTS

| | | |
|---|---|---|
| 1,092,827 | Dubail | Apr. 14, 1914 |
| 1,368,775 | Vreeland | Feb. 15, 1921 |
| 1,817,637 | Miller | Aug. 4, 1931 |
| 2,022,089 | Pond | Nov. 26, 1935 |
| 2,259,648 | Lucas | Oct. 21, 1941 |
| 2,283,871 | Norelius | May 19, 1942 |
| 2,367,255 | Aller et al. | Jan. 16, 1945 |